US008231512B2

(12) United States Patent
Schmidt

(10) Patent No.: US 8,231,512 B2
(45) Date of Patent: Jul. 31, 2012

(54) TOOL MAGAZINE FOR STORING DRIVER BITS AND/OR DRILL BITS THAT INCLUDES A MAGAZINE, A DRIVER HEAD, A BIT LOCKING DEVICE, AND SLIDERS FOR MOVING THE DRIVER BITS AND/OR DRILL BITS FROM A STORAGE POSITION TO A USE POSITION

(76) Inventor: Mike Schmidt, Medicine Hat (CA)

( * ) Notice: Subject to any disclaimer, the term of this patent is extended or adjusted under 35 U.S.C. 154(b) by 975 days.

(21) Appl. No.: 12/229,489

(22) Filed: Aug. 25, 2008

(65) Prior Publication Data

US 2010/0048369 A1 Feb. 25, 2010

(51) Int. Cl.
*B23Q 3/157* (2006.01)
*B23B 45/02* (2006.01)

(52) U.S. Cl. ................................ 483/61; 483/57; 483/39

(58) Field of Classification Search .................... 483/57, 483/60, 61, 47, 43, 42, 39; 81/439, 490, 81/177.4; 408/35
See application file for complete search history.

(56) References Cited

U.S. PATENT DOCUMENTS

| | | | | |
|---|---|---|---|---|
| 2,679,770 | A * | 6/1954 | Carter et al. | 173/214 |
| 3,006,395 | A * | 10/1961 | Dye | 81/177.4 |
| 3,194,286 | A * | 7/1965 | Wagner | 81/439 |
| 3,750,729 | A * | 8/1973 | Lemieux | 81/439 |
| 4,241,773 | A * | 12/1980 | Personnat | 81/177.4 |
| 4,372,362 | A * | 2/1983 | Ahn | 81/436 |
| 4,552,043 | A * | 11/1985 | Corona et al. | 81/490 |
| 4,604,005 | A * | 8/1986 | Russ | 408/35 |
| 4,762,036 | A * | 8/1988 | Orlitzky et al. | 81/437 |
| 4,928,381 | A * | 5/1990 | Yaguchi et al. | 483/47 |
| 5,065,498 | A * | 11/1991 | McKenzie | 483/57 |
| 5,325,745 | A * | 7/1994 | Koehler | 81/439 |
| 5,346,453 | A * | 9/1994 | Rivera-Bottzeck | 483/1 |
| 5,597,275 | A * | 1/1997 | Hogan | 408/239 R |
| 5,893,685 | A * | 4/1999 | Olson et al. | 408/35 |
| 6,007,277 | A * | 12/1999 | Olson et al. | 408/35 |
| 6,332,384 | B1 * | 12/2001 | Cluthe | 81/490 |
| 6,506,002 | B1 * | 1/2003 | Cummins | 408/35 |
| 6,601,483 | B2 * | 8/2003 | Wannop | 81/490 |
| 7,073,417 | B2 * | 7/2006 | Beauchamp | 81/490 |
| 7,086,314 | B2 * | 8/2006 | Wannop | 81/490 |
| 7,188,555 | B2 * | 3/2007 | Beauchamp | 81/439 |
| 7,237,458 | B2 * | 7/2007 | Shiao | 81/62 |
| 7,275,466 | B2 * | 10/2007 | Cluthe | 81/439 |
| 7,287,451 | B2 * | 10/2007 | Rodgers | 81/439 |
| 7,493,838 | B2 * | 2/2009 | Beauchamp | 81/177.4 |
| 7,562,606 | B2 * | 7/2009 | Grand et al. | 81/439 |
| 7,665,391 | B2 * | 2/2010 | Beauchamp | 81/177.4 |
| 7,757,589 | B2 * | 7/2010 | Kielland | 81/438 |
| 8,007,424 | B2 * | 8/2011 | Moser et al. | 483/57 |
| 2002/0007705 | A1 * | 1/2002 | Beauchamp | 81/490 |
| 2006/0053986 | A1 * | 3/2006 | Ward | 81/490 |
| 2006/0201290 | A1 * | 9/2006 | Rodgers | 81/439 |
| 2006/0201291 | A1 * | 9/2006 | Cluthe | 81/439 |
| 2007/0251358 | A1 * | 11/2007 | Grand et al. | 81/439 |
| 2007/0277654 | A1 * | 12/2007 | Beauchamp | 81/439 |
| 2007/0289418 | A1 * | 12/2007 | Rodgers | 81/439 |
| 2008/0041194 | A1 * | 2/2008 | Beauchamp | 81/177.4 |
| 2010/0242689 | A1 * | 9/2010 | Cluthe | 81/439 |

* cited by examiner

*Primary Examiner* — Erica E Cadugan
*Assistant Examiner* — Jason L Vaughan

(57) ABSTRACT

Retractable chuck for drill bits, screw bits and other tools for any chuck size operated by hand or power source which operates without the user touching the bits to move into operating position.

1 Claim, 8 Drawing Sheets

TOOL MAGAZINE FOR STORING DRIVER BITS AND/OR DRILL BITS THAT INCLUDES A MAGAZINE, A DRIVER HEAD, A BIT LOCKING DEVICE, AND SLIDERS FOR MOVING THE DRIVER BITS AND/OR DRILL BITS FROM A STORAGE POSITION TO A USE POSITION

RELATED APPLICATIONS

The present application is related to U.S. Pat. No. 6,506,002 B1, issued Jan. 14, 2003, by Cummins, included by reference herein.

FIELD OF THE INVENTION

The present invention relates to a retractable quick change driver and, more particularly, to a driver equipped to change drill bits, screw and other fastener driving tools.

BACKGROUND OF THE INVENTION

Productivity of a laborer or of a machine is affected by the length of time that is required to change tooling in accordance with the task at hand. Such bits as drill, screw, hex, machine tool and others have to be changed for various tasks performed on the job. In many applications it can be required to have 10 or more sizes or types of bits to complete one job. Each time a bit or tool needs to be changed the operator must remove the old tool, locate the new one and insert it. Often times the tools are not convenient or must be located. They get mixed in with other tools, lost or can not be sized or chose ahead of time because there is no way to keep them sorted or have them readily available.

Other solutions do exist. One is to provide a holder on the outside of the machine in which one or more tools can be secured for close at hand means of acquiring them. Other solutions are to provide a machine with multiple heads in which a head may be turned and a new tool provided. In automated machines such as a computer controlled machines the computer tells the machine which tool is needed and the machines locates and changes the tool itself.

While other solutions do exist many have at least one disadvantage over the present invention. For example while an external tool holder does exist to hold additional tools it is cumbersome and inefficient. Tools can easily get lost or be in the way when the machine is being used in restricted area locations. The tool holders do not permit fast changing of tools either. Where multiple heads or computer controlled machines are used they do not lend them selves to the portability of a hand tool. They can be extremely expensive and large in size so they do not lend themselves to a mobile service need.

It is therefore an object of the invention to lessen the time and increased the ease of changing tool bits.

It is another object of the invention to increase productivity of the operator or machine.

It is another object of the invention to permit the user to remain free of contaminants by not being required to touch the tool bits.

It is another object of the invention to provide the user with a compact easy to carry multiple bit holding device.

SUMMARY OF THE INVENTION

In accordance with the present invention, there is provided retractable chuck for drill bits, screw bits and other tools for any chuck size operated by hand or power source which operates without the user touching the bits to move into operating position.

BRIEF DESCRIPTION OF THE DRAWINGS

A complete understanding of the present invention may be obtained by reference to the accompanying drawings, when considered in conjunction with the subsequent, detailed description, in which:

FIG. 7 is a side perspective view of a barrel showing the association between it and where the slider and tool holder fit in.

For purposes of clarity and brevity, like elements and components will bear the same designations and numbering throughout the Figures.

Description of The Preferred Embodiment

Figure 1:
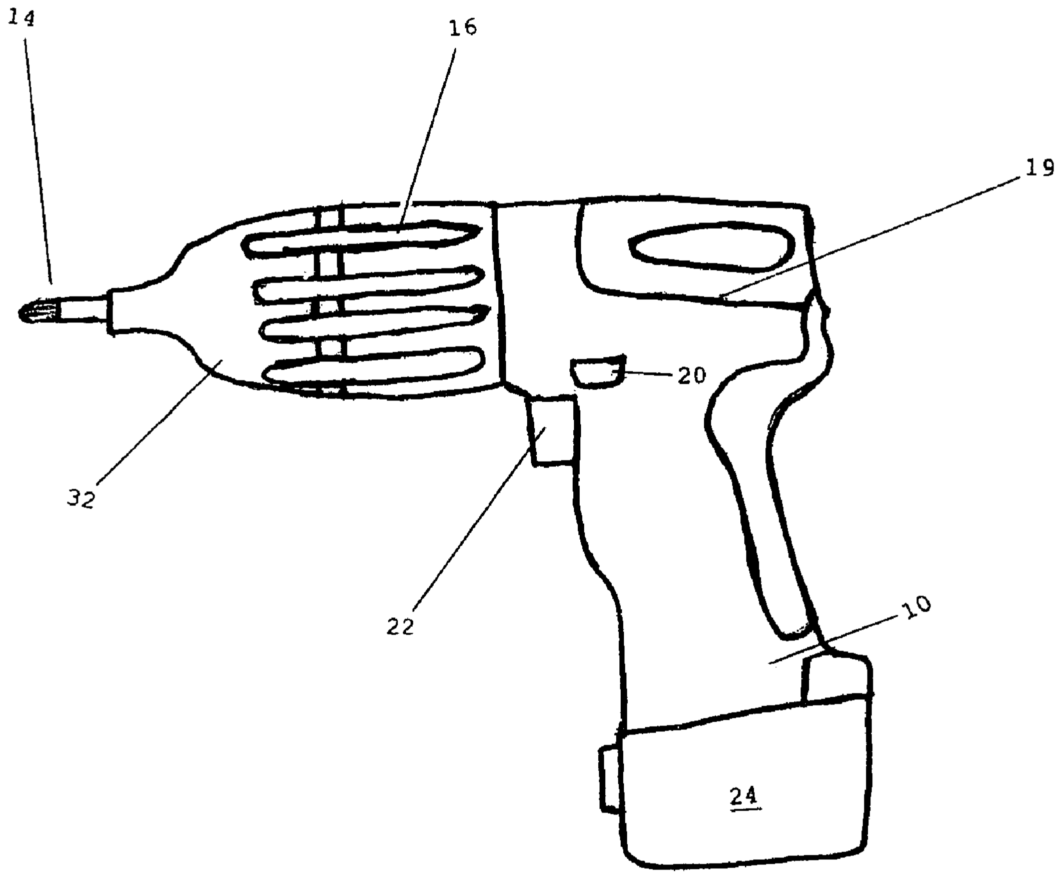
FIG. 1 is a left elevation view of a cylindrical tool magazine in its complete and assembled form.

Referring to FIG. 1, there is shown a left side elevation of the present invention which incorporates a prior art hand drill 10 and the present invention a cylindrical tool magazine head 32. The figure shows the removably attached power pack 24 that provides DC power to the motor mechanism 19 that is controlled by the motion selection switch 22. The direction of rotation of the screw driver bit 14 can be manually changed through positioning of the reverse and forward applicator 20 switch that is electronically attached between the power pack 24 and the motor mechanism 19. The screw driver bit 14 is slidably located in or out of the hexagon locking device 26 through the retractable head 16 thus providing the operator with a selection of bits for individual applications.

Figure 2:
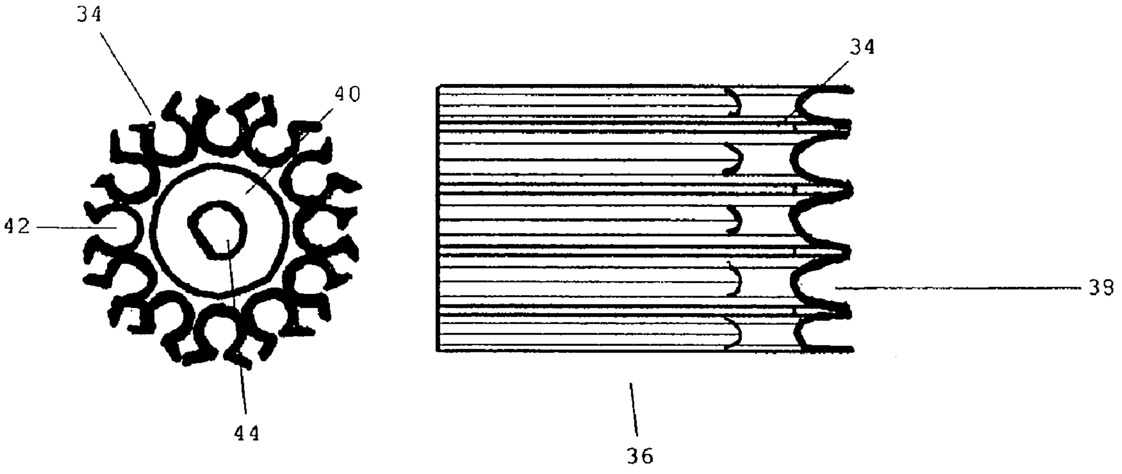
FIG. 2 is a side elevation view of a barrel which holds the sliders and bits when not in use.

Referring now to FIG. 2, there is shown a side elevation view of a barrel 36 which holds a plurality of sliders and bits when not in use. The barrel 36 is fitted with slider slots 34 configured into separate open sided tubular shaped slider barrels 42 arranged in a circular design around the perimeter of a the barrel 36. The internal portion of the barrel 36 is also cylinder shaped with a center hole fitted with a D slot 44 and washer 40 to prevent slippage when attached to the motor mechanism 19 shaft (not shown). Key tabs 38 of a semi circular shape permit alignment to the head (Not shown) by indexing both pieces in a manner that permits extension of the slider slots 34 from one part to the other permitting the slider 54 (not shown) to travel back and forth unimpaired.

Figure 3:
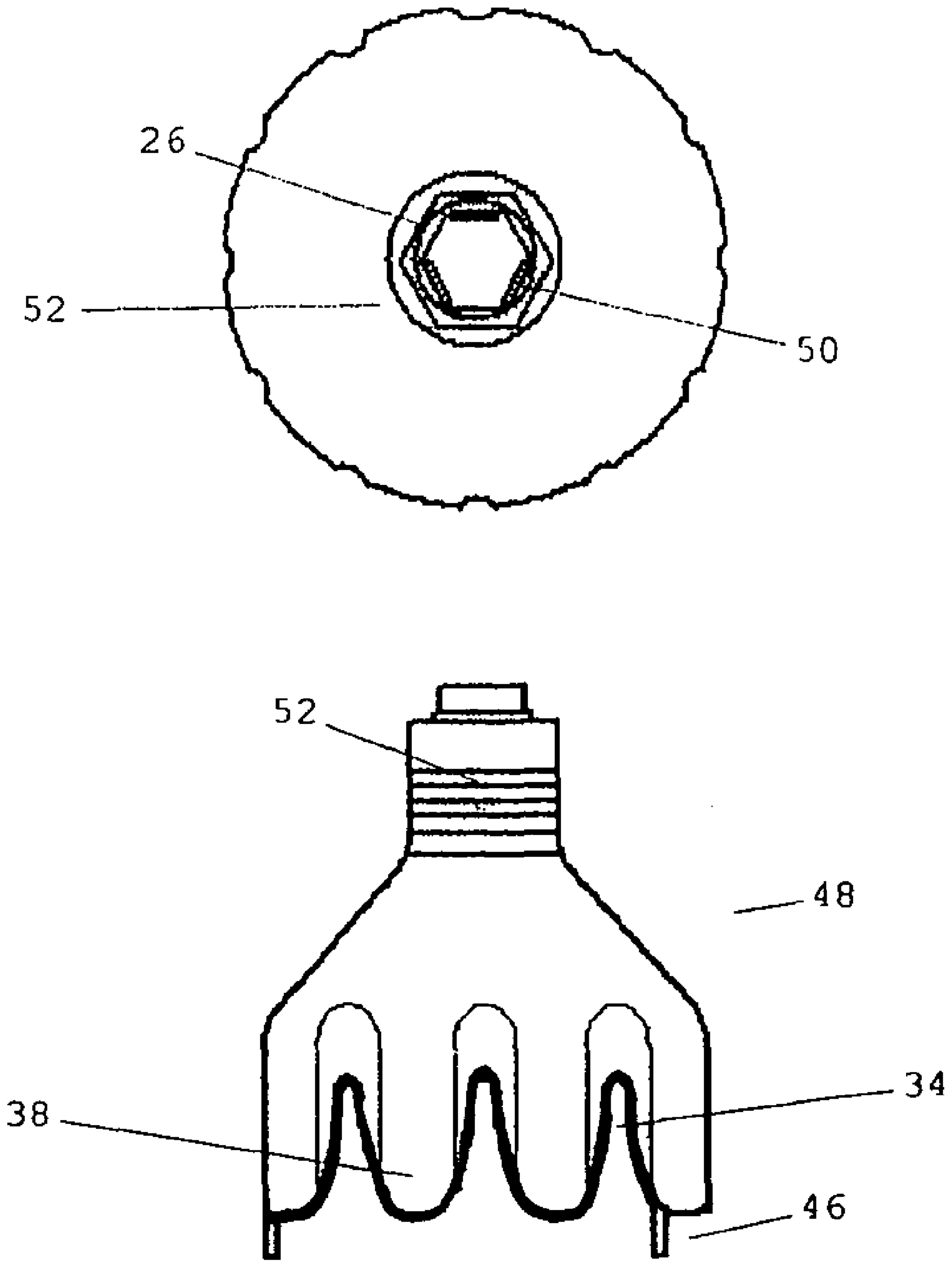
FIG. 3 is a side and top view of a head which accepts the tools and sliders when a particular tool is in use.

Referring to FIG. 3, there is shown a side and top view of a head 48 which accepts the tools and sliders when a particular tool 68 is in use. The head 48 consists of a conical shaped device fitted with a plurality of threaded index pins 46 and a plurality of key tabs 38 for indexing and attaching the head 48 to the barrel 36 (not shown) in a secure removable manner. On the sides of the head 48 are slider slots 34 that permit the slider 54 (not shown) to travel into the head 48. The most forward portion of the head 48 is reduced in size through a progressively smaller cone ending in a cylinder portion that further ends in a hexagon locking device 26. The hexagon locking device 26 consists of a hexagon shaped port fitted with a plurality of retractable locks 50 that are engaged or disengaged by means of the hexagon lock release 52. The hexagon lock release 52 is a spring loaded tubular slide that causes the retractable locks 50 to become pressured though its travel over and off of them. This hexagon locking device 26 then serves to retain the tool holder 70 (not shown) into position while being used by the operator.

Figure 4:
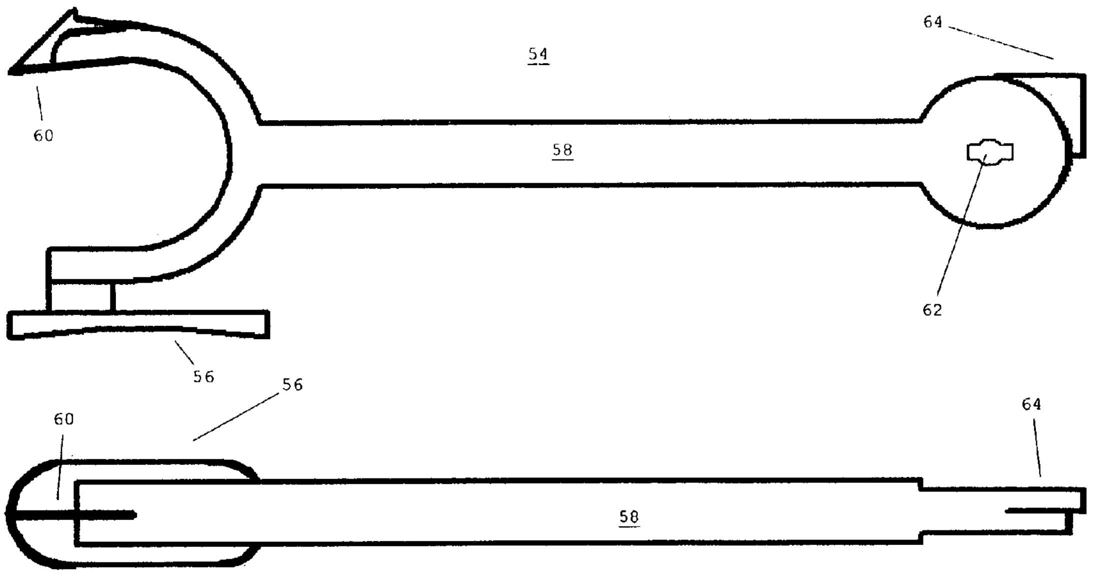
FIG. 4 is a side & top elevation view of a slider.

Referring now to FIG. 4, there is shown a side & top elevation view of a slider 54. Comprising of a generally rectangular shank 58 equipped on one end with a thumb tab 56 for movement of the slide to and from by a human thumb and shaped in a general concave rectangular form. A lifting guide 60 is fitted opposite yet on the same end of the slider 54 which is generally sloped to permit easy movement over irregularities in the slider barrels 42 (not shown). On the opposite end of the shank 58 there exists a stop 64 to prevent the slider 54 and tool holder 70 (not shown) from going past center when the tool holder 70 (not shown) is forced in an extended direction of tool 68 usage. There is a connecting slot 62 that protrudes through the shank 58 at the stop 64 end for attachments of the tool holder 70 (not shown). The slot consists of a circular hole which is slotted on a horizontal plane with the shank 58 to permit retention of the tool holder 70 (not shown) when the tool holder 70 (not shown) is removably attached.

Figure 5:
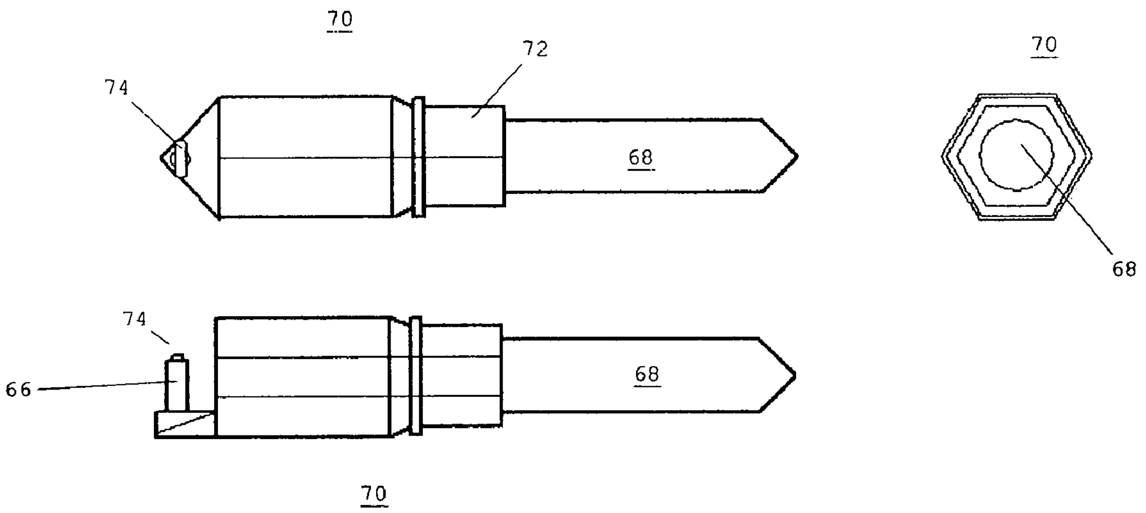
FIG. 5 is a side, top and end elevation view of a tool holder.

Referring to FIG. 5, there is shown a side, top and end elevation view of a tool holder 70. A tool holder 70 is comprised of a connecting shaft 66 that permits removable pivotal attachment to the slider 54 (not shown) by means of the connecting slot 62 and retained in the connecting slot 62 (not shown) by means of the connecting shaft t retainer 74. The connecting shaft t retainer 74 when inserted through the connecting slot 62 (not shown) in it's indexed position and then turned 90 degrees prevents extraction of the connecting shaft 66. The portion thus described is permanently attached to the hexagon shaft 72. The hexagon shaft 72 is configured to receive the tool's shaft shape. In a preferred configuration the tool's shaft would be cylindrical in shape and attached permanently by means of epoxy though other means of attachment would occur because of the various tool's shaft configurations and the tool's shaft being a prior art component.

Figure 6:
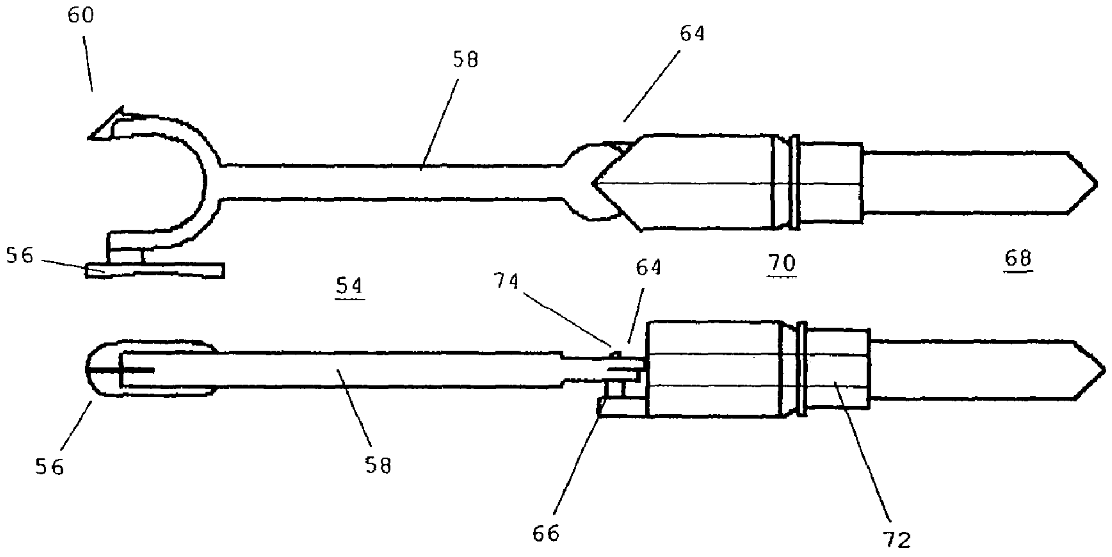
FIG. 6 is a side & top elevation view of a slider and tool holder connected.

Referring to FIG. 6, there is shown a side & top elevation view of a slider 54 and tool holder 70 connected. In a preferred embodiment of the present invention a slider 54 and tool holder 70 would be connected by means of a connecting shaft 66 on the slider 54 consisting of a generally rod shaped connecting shaft 66 ending with a T tab passing though a generally circular hole with a T slot.

A lifting guide 60 and thumb tab 56 cause the parts to align in the slider barrels 42 (not shown) and permit the operator to extend the tool 68 for use when extended into the hexagon locking device 26 (not shown) or retract the tool 68 into the barrel 36 for storage when not in use. The pivotally attached tool holder 70 is able to flex and move into the reduced diameter of the generally conical portion of the head 48 entering the hexagon locking device 26 unimpaired.

Figure 7:
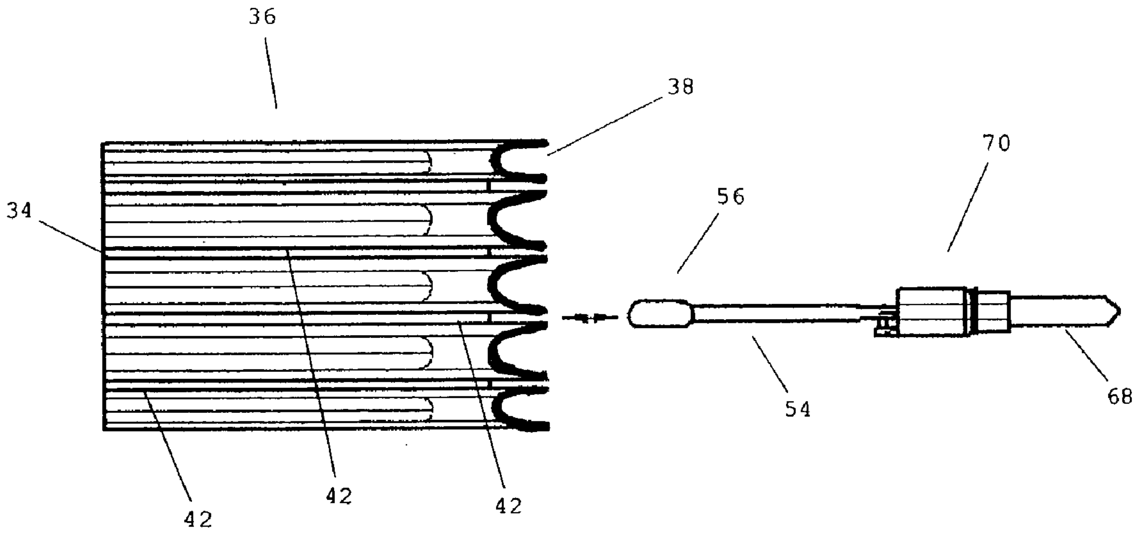

Referring to FIG. 7, there is shown a side perspective view of a barrel 36 showing the association between it and where the slider 54 and tool holder 70 fit in. In a preferred version of the present invention the slider 54 moves through the slider slots 34 and rides in the slider barrels 42 (not shown). The barrel 36 is depicted removed from the head 48 (not shown), but key tabs 38 indicate where the head 48 (not shown) would be attached if present. The thumb tab 56 is external of the barrel 36 for use by the operators thumb. The thumb tab 56 which is general rectangular and concave in shape both prevents the slider 54 from falling into the slider barrels 42 and permits movement both extending the tool holder 70 to a position of use and for retraction of the tool holder 70 into the barrel 36 for storage. When extended the tool 68 fits into the hexagon locking device 26 (not shown) where it is retained. The barrel 36 is equipped with a plurality of slider barrels 42 to permit storage of a plurality of tools while the hexagon locking device 26 is capable of holding only one tool 68 at a time.

Figure 8:
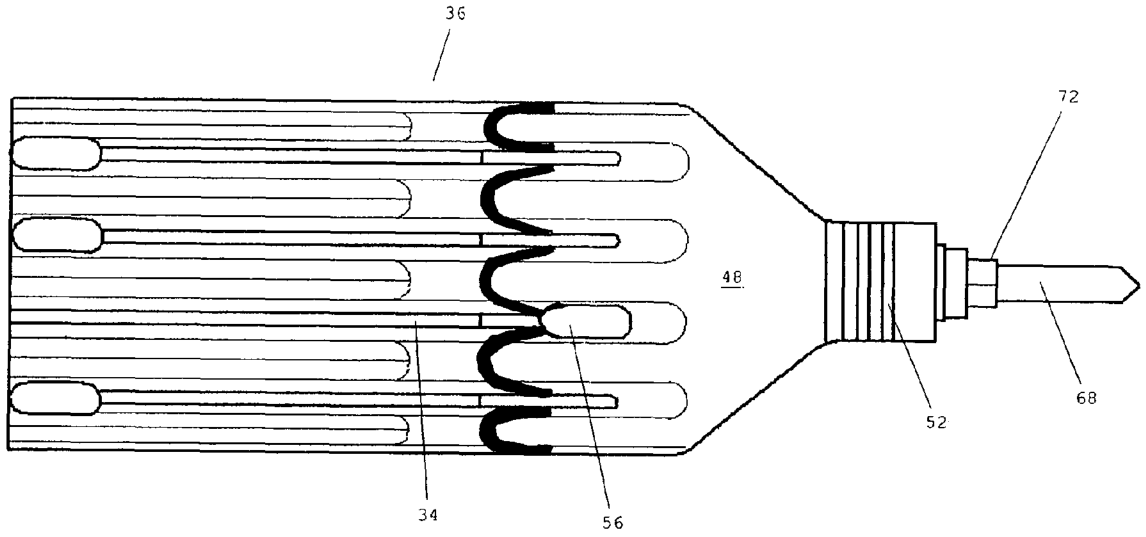
FIG. 8 is a side elevation view of a barrel connected to a head depicting a tool in the hexagon tool holder.

Referring to FIG. 8, there is shown a side elevation view of a barrel 36 connected to a head 48. This assembled view shows a preferred embodiment of the present invention. The thumb tab 56 labeled indicates the position of thumb tab 56 when its connecting slider 54 (not shown) and tool holder 70 are in the extended use position. The other thumb tabs (not labeled) are depicted in the storage position. The tool 68 in use position along with its hexagon shaft 72 are shown in the head 48 and the hexagon lock release 52 in it's relative position on the head 48. A plurality of slider slots 34 are shown in their circumferential position around the barrel 36.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A cylindrical tool magazine for storing a plurality of driver bits and/or drill bits, the cylindrical tool magazine configured to be attached to a portable motorized hand drill and the cylindrical tool magazine comprising:

a barrel comprising a plurality of tubular shaped slider openings arranged around the perimeter of the barrel,
wherein the barrel is configured to hold the plurality of driver bits and/or drill bits when the driver bits and/or drill bits are not in use,
wherein the plurality of tubular shaped slider openings are open sided on a side located on the perimeter of the barrel such that the open sided tubular shaped slider openings form slider slots around the perimeter of the barrel,
wherein the barrel includes an internal center through hole configured to allow attachment of the barrel to a rotary drive shaft of the hand drill to facilitate rotation of the barrel relative to the remaining portions of the hand drill other than the drive shaft,
wherein the barrel includes a plurality of semi-circular key tab slots;

a head comprising a plurality of slider slots and a conical shaped device fitted with a plurality of index pins and a plurality of key tabs;
wherein the plurality of key tabs locate the head relative to the barrel,
wherein the plurality of index pins attach the head to the barrel,
wherein the plurality of slider slots in the head align with the slider slots in the barrel when the head is attached to the barrel,
wherein the end of the head that is opposite the index pins and key tabs is reduced in size relative to the end of the head that is coincident with the index pins and key tabs;

a hexagon locking device located on the end of the head that is reduced in size and comprising a hexagon shaped port fitted with a plurality of retractable locks that is engaged and disengaged by a hexagon lock release, wherein the hexagon lock release is a spring loaded tubular slide;

a plurality of sliders each comprising a rectangular body, on one end a thumb tab and a sloped lifting guide, and on the opposite end a stop and a connecting slot, wherein the connecting slot comprises a circular hole formed with rectangular slots at the perimeter of circular hole, wherein the sloped lifting guide, stop, and connecting slot are located within the barrel and head, wherein the thumb tab of each slider is located on the outer perimeter of the barrel and head, wherein the thumb tab includes a portion that is connected to the rectangular body and slides within the slots of the barrel and head;

a plurality of tool holders each comprising a connecting shaft attached to a hexagon shaft, wherein each of the connecting shafts of the tool holders cooperates with a respective one of the connecting slots of one of the sliders to connect the respective the tool holder to the respective slider, wherein the connecting shafts each comprises a T shaped retainer that passes through a respective one of the connecting slots of a respective one of the plurality of sliders and is rotated 90 degrees to connect a respective one of the plurality of tool holders to the respective slider;

wherein the plurality of tool holders cooperates with the plurality of sliders to retract and extend the driver bits and/or drill bits from a storage position inside of the barrel to a use position within the hexagon locking device.

* * * * *